(12) United States Patent
Furuya et al.

(10) Patent No.: US 6,478,460 B2
(45) Date of Patent: Nov. 12, 2002

(54) HEADLAMP OF AUTOMOBILE

(75) Inventors: Takayuki Furuya, Isehara (JP); Kinya Iwamoto, Yokohama (JP); Kiyotaka Ozaki, Yokosuka (JP); Kenjo Umezaki, Yokosuka (JP)

(73) Assignees: Ichikoh Industries, Ltd., Tokyo (JP); Nissan Motor Co., Ltd., Yokohama (JP)

( * ) Notice: Subject to any disclaimer, the term of this patent is extended or adjusted under 35 U.S.C. 154(b) by 46 days.

(21) Appl. No.: 09/727,553

(22) Filed: Dec. 4, 2000

(65) Prior Publication Data

US 2001/0038535 A1 Nov. 8, 2001

(30) Foreign Application Priority Data

Dec. 3, 1999 (JP) ............................................ 11-345014

(51) Int. Cl.[7] .............................. F21V 17/02; B60Q 1/08
(52) U.S. Cl. ........................ 362/514; 362/283; 362/284; 362/465
(58) Field of Search ................................ 362/281, 283, 362/284, 514, 531, 465

(56) References Cited

U.S. PATENT DOCUMENTS

| 1,148,942 | A | * | 8/1915 | Wilson | 362/283 |
|---|---|---|---|---|---|
| 1,205,224 | A | * | 11/1916 | Koechlein | 362/283 |
| 4,007,365 | A | * | 2/1977 | Stempfle et al. | 362/283 |
| 4,663,696 | A | * | 5/1987 | Miyazawa et al. | 362/514 |
| 5,711,590 | A | * | 1/1998 | Gotoh et al. | 362/283 |
| 6,059,435 | A | * | 5/2000 | Hamm et al. | 362/514 |

FOREIGN PATENT DOCUMENTS

| JP | 5-23216 | 4/1993 |
|---|---|---|
| JP | 8-183385 | 7/1996 |
| JP | 11-78675 | 3/1999 |

* cited by examiner

*Primary Examiner*—Alan Cariaso
(74) *Attorney, Agent, or Firm*—Foley & Lardner

(57) ABSTRACT

In a headlamp of an automobile, a reflector is divided to an upper reflector member positioned above an optical axis and a lower reflector member including the optical axis; the upper reflector is rotatable and provided with a reflection face for forming a diffusing luminous intensity distribution pattern; the lower reflector member is provided with a light source bulb, rotatable and provided with a reflection face for forming a reference luminous intensity distribution pattern. Therefore, the diffusing luminous intensity distribution pattern and the reference luminous intensity distribution pattern can independently or simultaneously be changed by rotating the upper reflector member and the lower reflector member independently or simultaneously. Accordingly, visibility is improved when an automobile is running on a curved road.

6 Claims, 14 Drawing Sheets

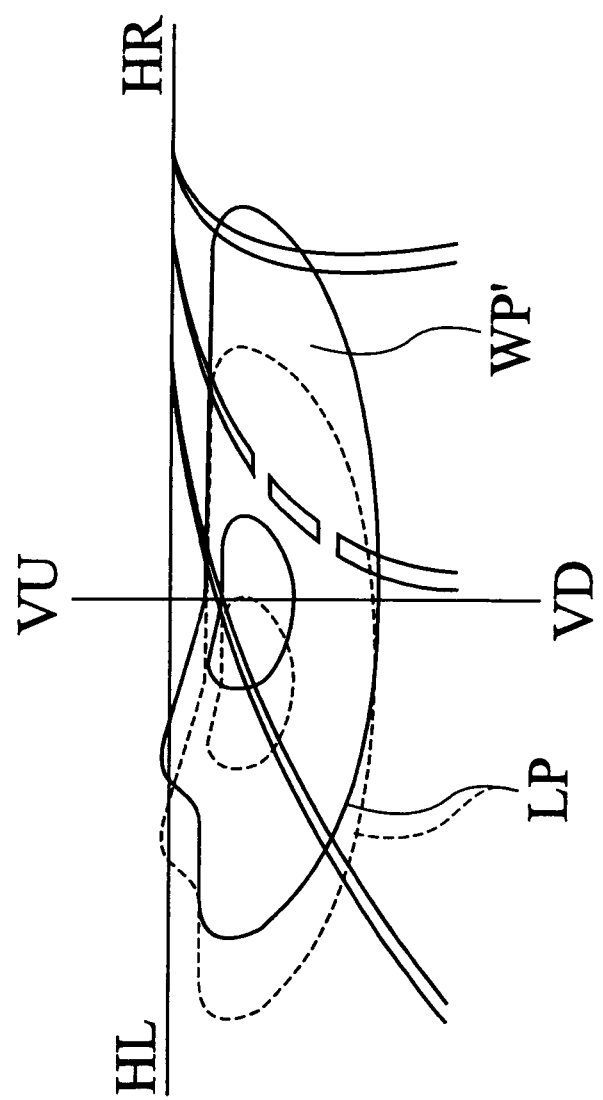
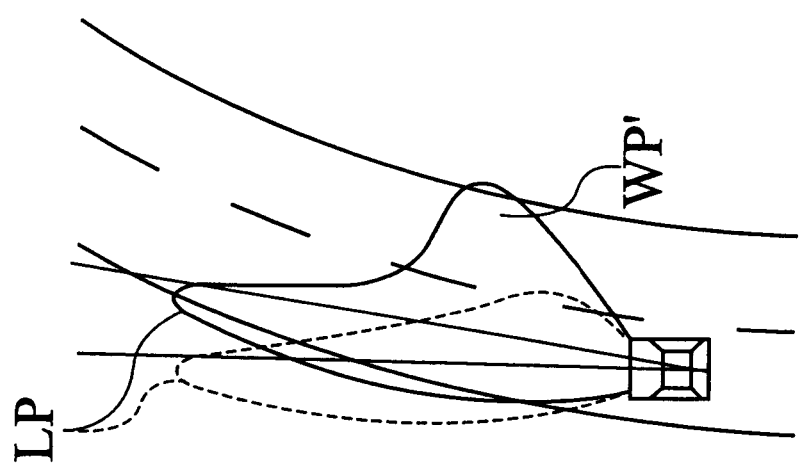
FIG.10B
FIG.10A

HEADLAMP OF AUTOMOBILE

BACKGROUND OF THE INVENTION

1. Field of the Invention

The present invention relates to a headlamp of an automobile where a luminous intensity distribution pattern is changed on the basis of a curving angle of an automobile by varying an illumination direction and an illumination range of light, and in particular to a headlamp of an automobile where a diffusing luminous intensity distribution pattern and a converging luminous intensity distribution pattern are respectively changed relative to a fixed reference luminous intensity distribution pattern independently or simultaneously so that visibility is improved when an automobile is running on a curved road.

2. Description of the Related Art

In the present specification and drawings, reference symbol "L" denotes "left side" in a case that a driver faces front, reference symbol "R" denotes "right side" in a case that a driver faces front, reference symbol "U" denotes "upper side" in a case that a driver faces front, and reference symbol "D" denotes "lower side" in a case that a driver faces front.

Also, reference symbol "Z—Z" denotes "optical axis", reference "HL-HR" and "HR-HL" denote "horizontal axis" which is horizontal to the optical axis Z—Z or "horizontal axis" of a luminous intensity distribution pattern, and reference symbol "VU-VD" denotes "vertical axis" which is vertical to the optical axis Z—Z or "vertical axis" of a luminous intensity distribution pattern.

A headlamp of an automobile of this type is generally provided with a light source bulb, a movable reflector and driving means for rotating the movable reflector, where the movable reflector is rotated by the driving means so that an illumination direction and an illumination range of light from the light source bulb are changed so that a luminance intensity distribution pattern is changed. As such a headlamp of an automobile, there are disclosures listed hereinbelow, for example, a Japanese Patent Publication No. 5-23216, a Japanese Patent Application Laid-Open No. 8-183385 and a Japanese Patent Application Laid-Open No. 11-78675.

However, each of the above mentioned conventional headlamps for an automobile is structured such that only a portion of a luminous intensity distribution pattern is merely changed.

SUMMARY OF THE INVENTION

The present invention has been achieved with such points in mind.

It therefore is an object of the present invention to provide a headlamp of an automobile where a diffusing luminous intensity distribution pattern and a reference luminous intensity distribution pattern can be changed independently from each other or simultaneously so that visibility is improved when an automobile is running on a curved road.

In order to achieve the above object, in a headlamp of an automobile according to an aspect of the present invention, a reflector is divided to an upper reflector member positioned above an optical axis of the headlamp and a lower reflector member including the optical axis; the upper reflector member is rotatable and is provided with a reflection face for forming a diffusing luminous intensity distribution pattern; and the lower reflector member is provided with a light source bulb, is rotatable and is provided with a reflection face for forming a reference luminous intensity distribution pattern.

As a result, in the headlamp of an automobile of this aspect, the upper reflector member and the lower reflector member are independently or simultaneously rotated so that the diffusing luminous intensity distribution pattern and the reference luminous intensity distribution pattern can independently or simultaneously be changed. Accordingly, visibility is improved when an automobile is running on a curved road.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 10A is an explanatory diagram of a plan view of a luminous intensity distribution pattern obtained when an automobile curves to the right side in a middle speed running situation in the second embodiment;

FIG. 10B is an explanatory diagram of a forward view of the luminous intensity distribution pattern in the second embodiment;

Figure 11B:
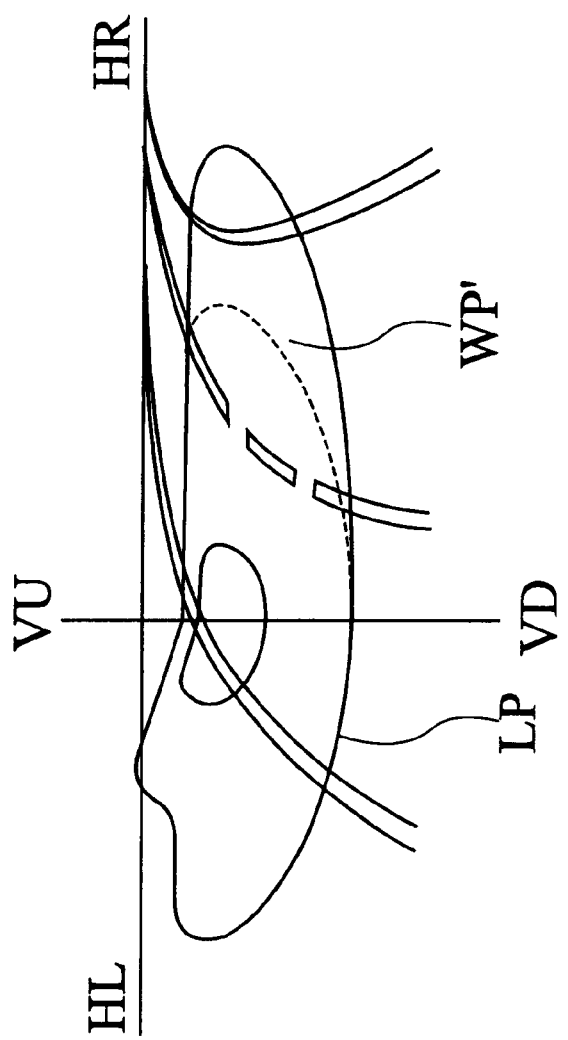
Figure 11A:
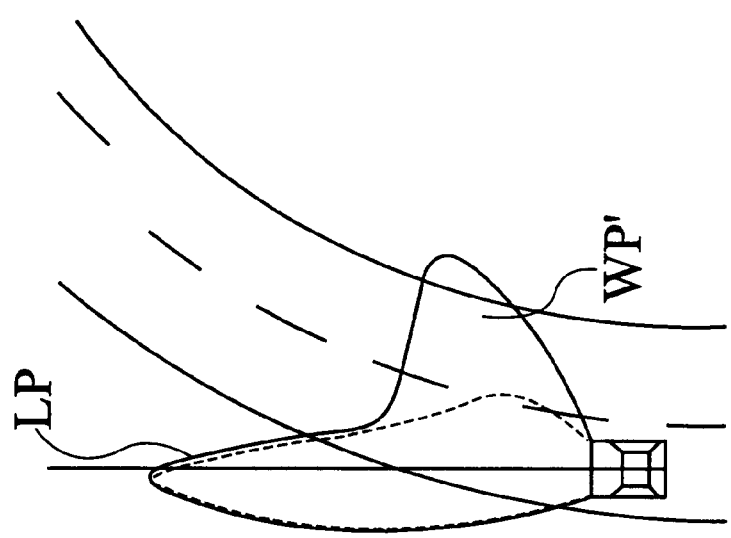
Figure 12:
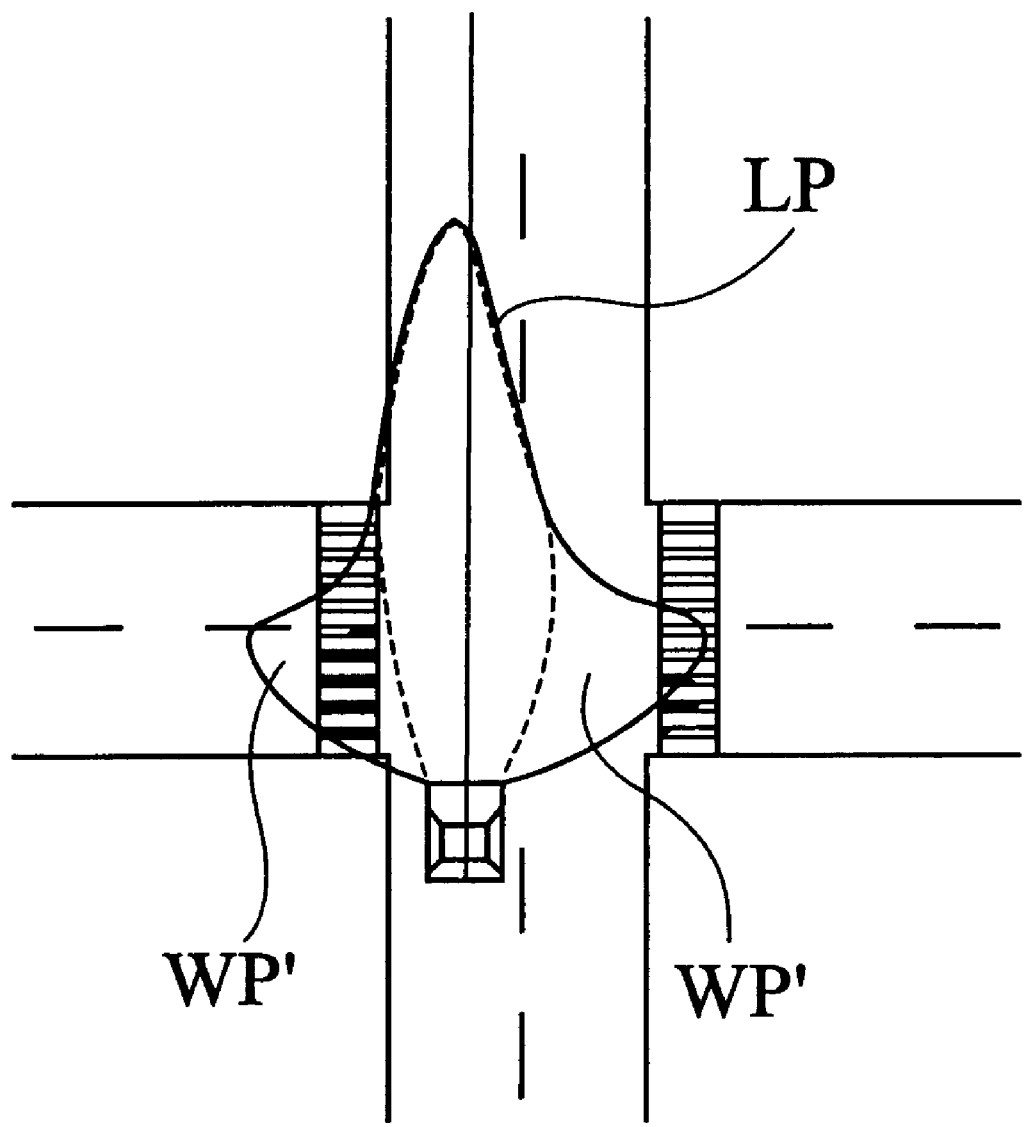
Figure 13:
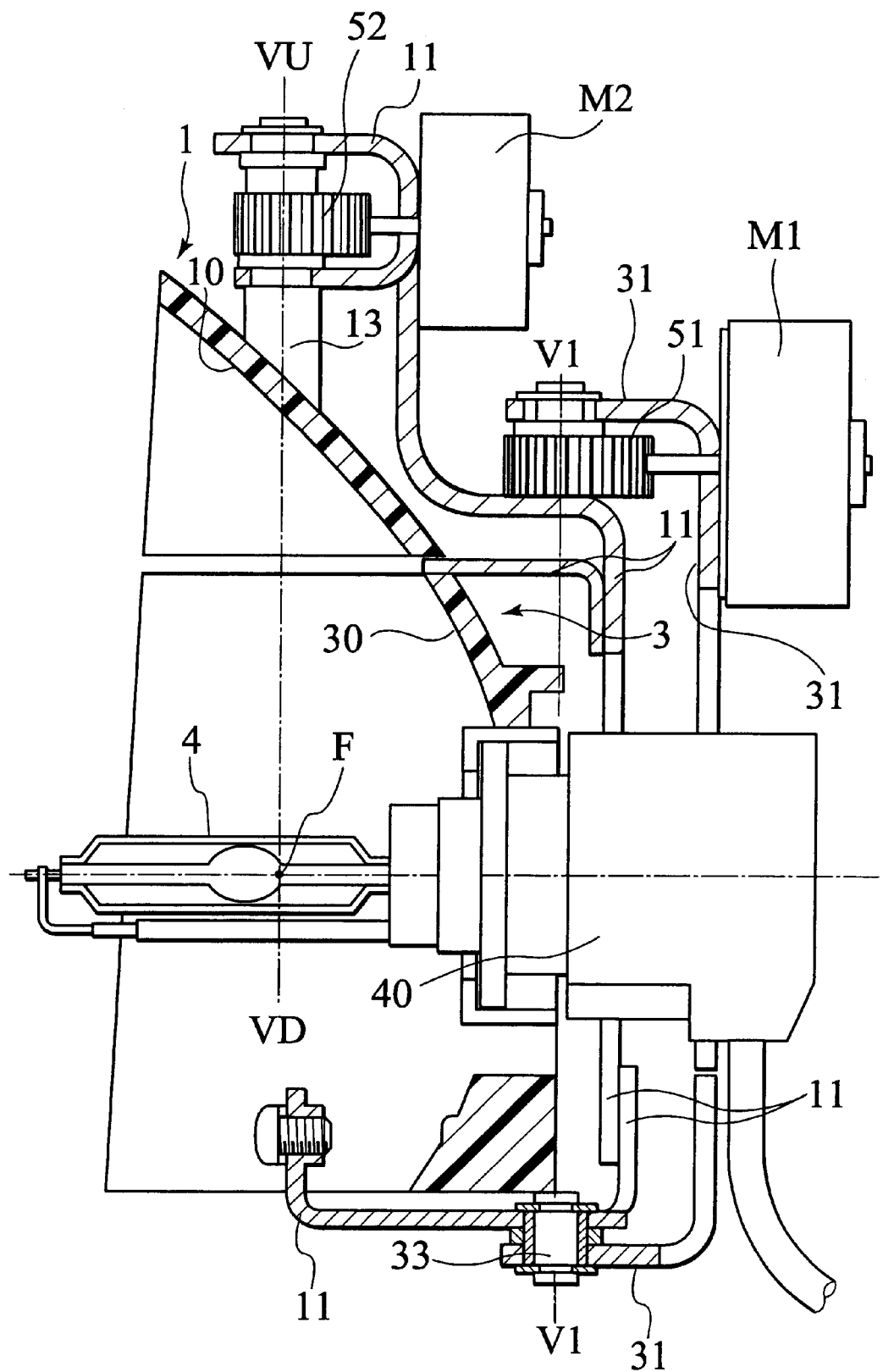
Figure 14:
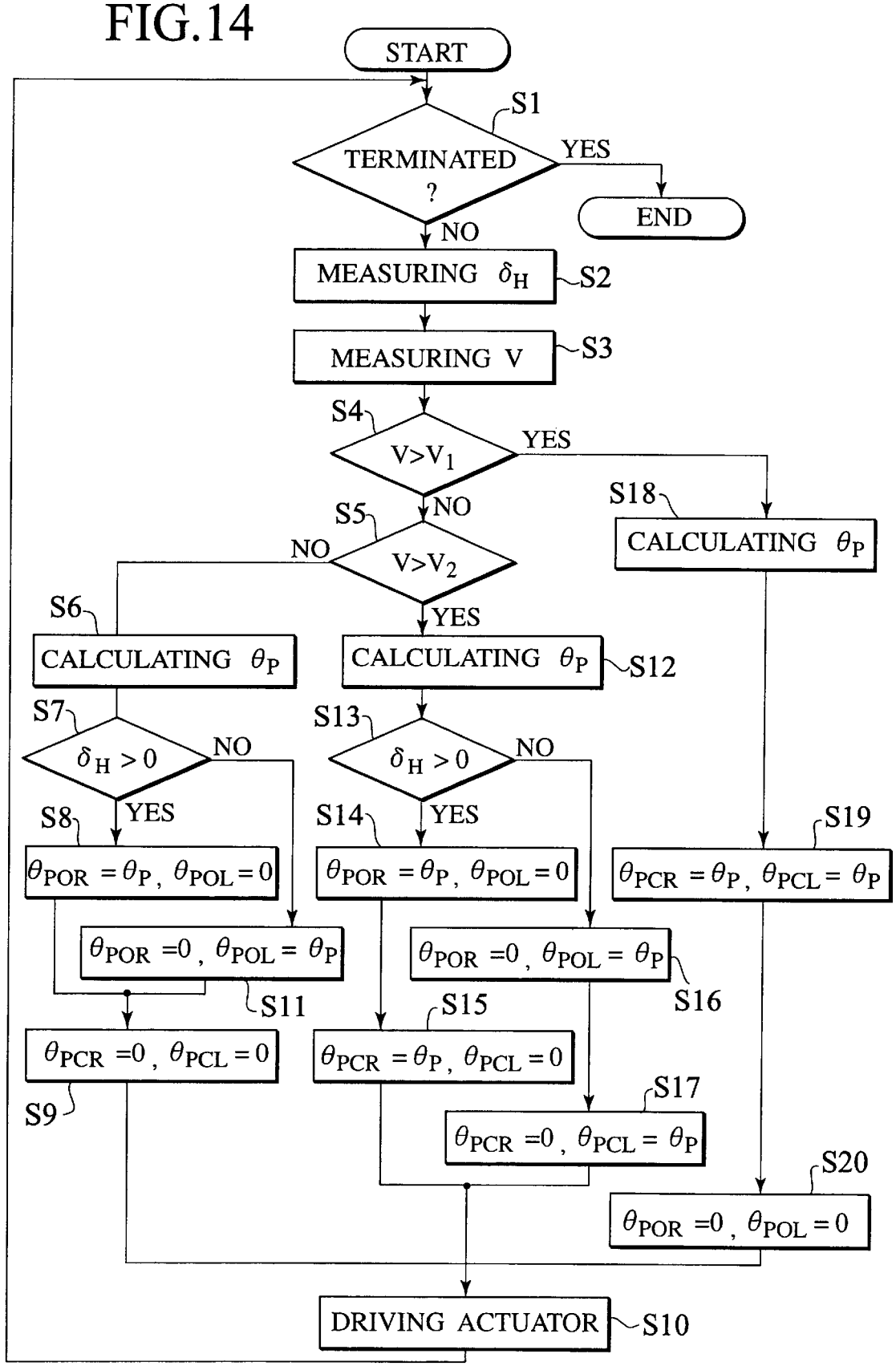
Figure 15:
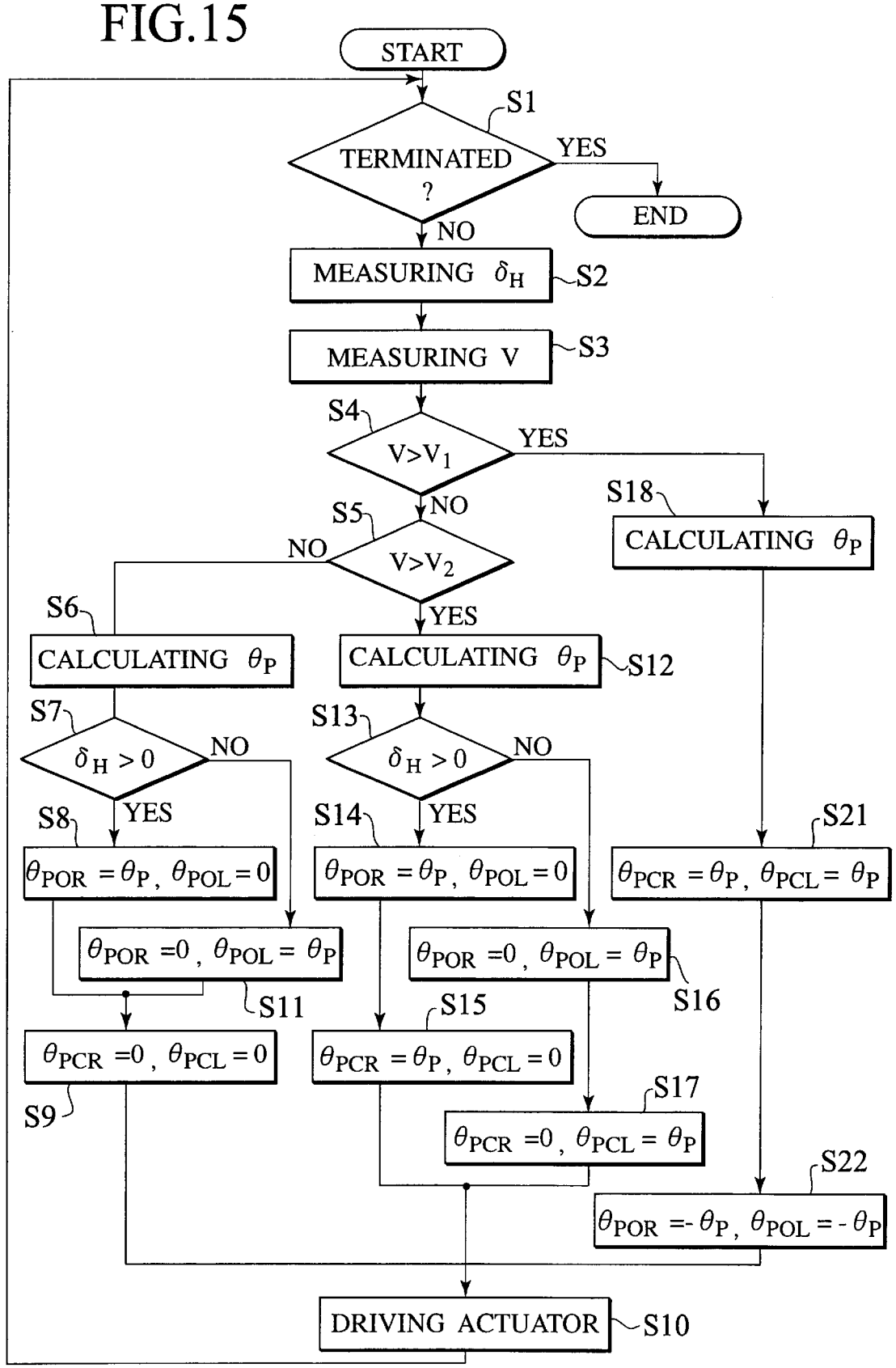

FIG. 11A an explanatory diagram of a plan view of a luminous intensity distribution pattern obtained when an automobile curves to the right side in a low speed running situation in the second embodiment;

FIG. 11B is an explanatory diagram of a forward view of the luminous intensity distribution pattern in the second embodiment;

FIG. 12 is an explanatory diagram of a plan view of a luminous intensity distribution pattern when an automobile turns to the left or the right at a crossing point in the second embodiment;

FIG. 13 is a vertical sectional view of a main portion (reflector) showing a third embodiment of an headlamp of an automobile of the present invention;

FIG. 14 is a flow chart diagram of operations for using an headlamp of an automobile of the present invention; and FIG. 15 is another flow chart diagram of operations for using an headlamp of an automobile of the present invention in which some steps in FIG. 14 are replaced with some modified steps.

DETAILED DESCRIPTION OF THE PREFERRED EMBODIMENTS

There will be detailed below the preferred embodiments of the present invention with reference to the accompanying drawings. Like members are designated by like reference characters. Hereinafter, three of embodiments of a headlamp of an automobile of the present invention will be explained with reference to the accompanying drawings.

Figure 1:
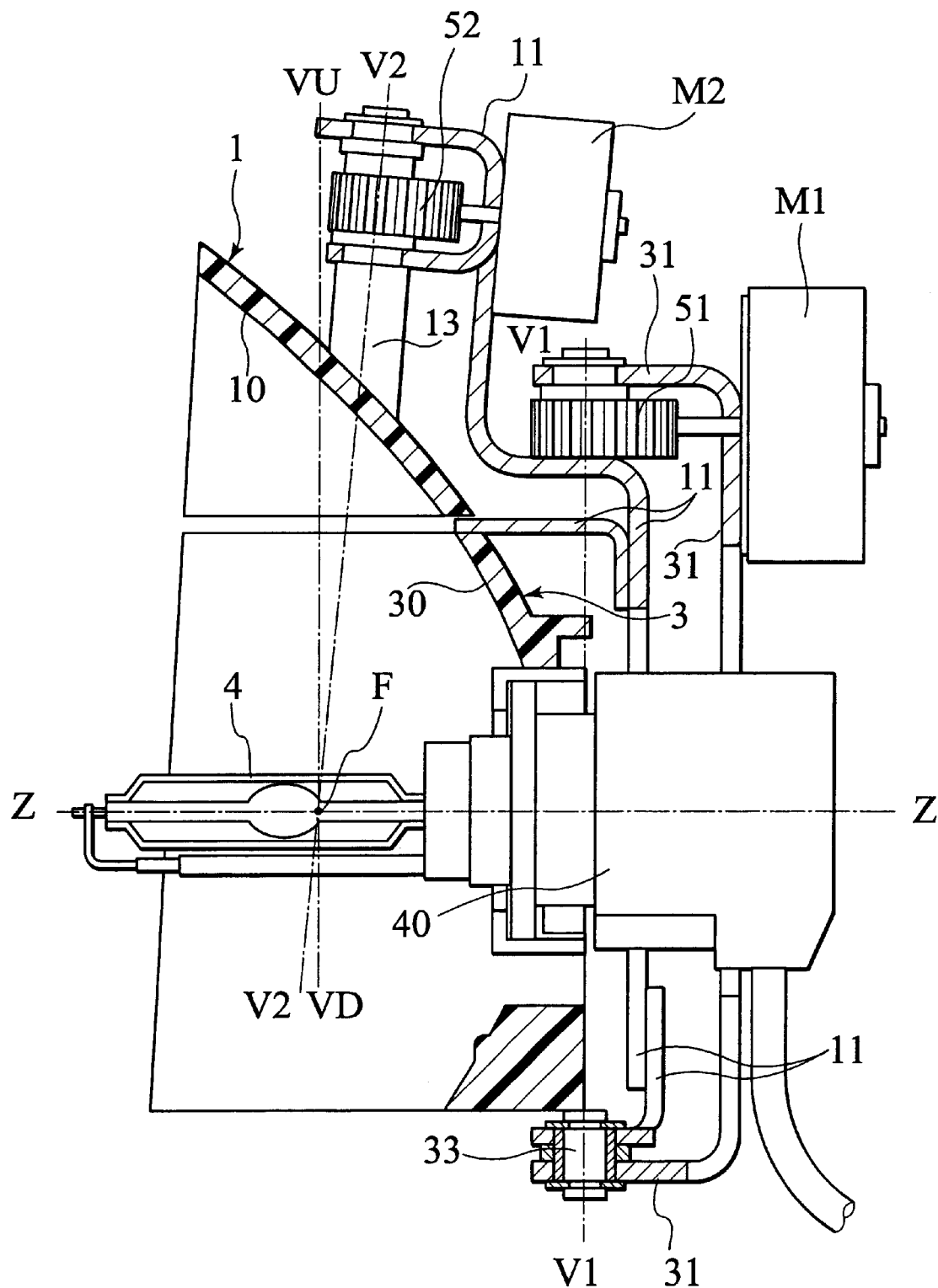
FIG. 1 is a vertical sectional view of a main portion (reflector) showing a first embodiment of a headlamp of an automobile of the present invention and a sectional view taken along line I—I in FIG. 2.
Figure 2:
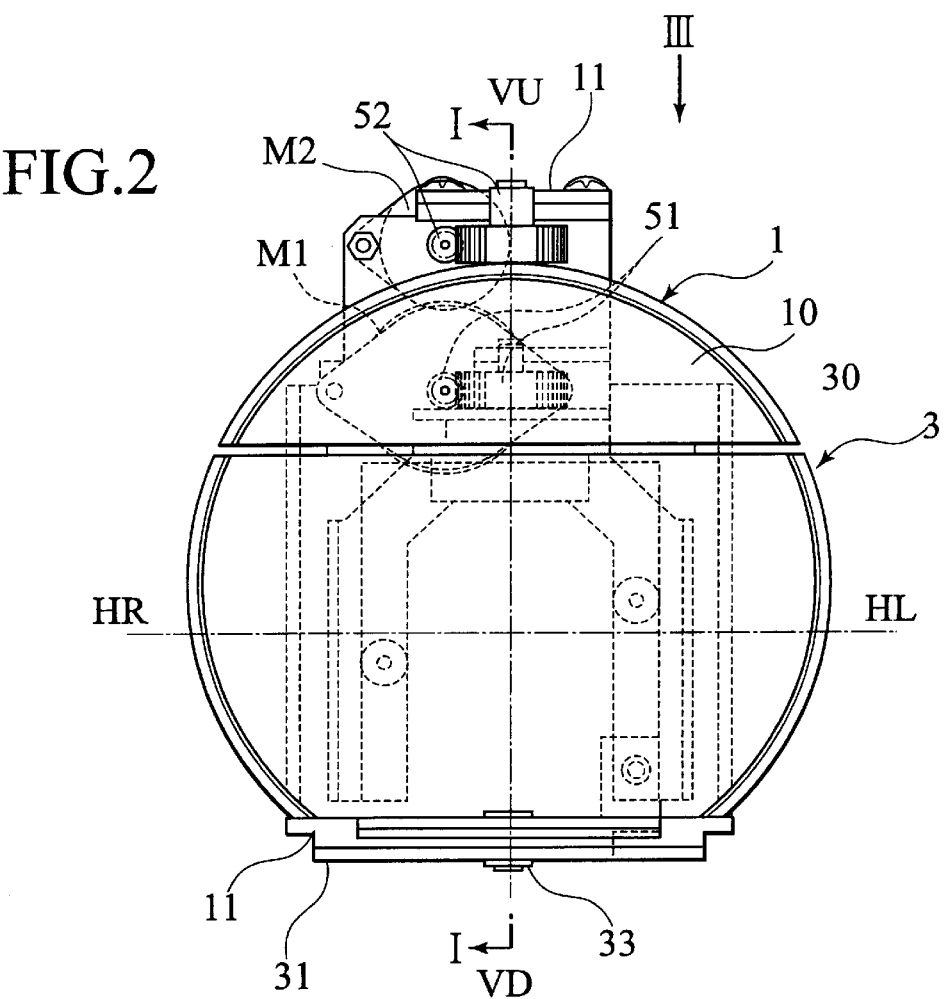
FIG. 2 is a front view of the main portion.

FIGS. 1 to 7 show a first embodiment of a headlamp of an automobile of the present invention. In the drawings, reference numerals 1 and 3 denote reflector members. As shown in FIGS. 1 and 2, a reflector of the present invention is divided to two members, namely, the upper reflector member 1 positioned above an axial line Z—Z of the headlamp and the lower reflector member 3 including the axial line Z—Z, along a horizontal line parallel to a horizontal line HR-HL.

Figure 3:
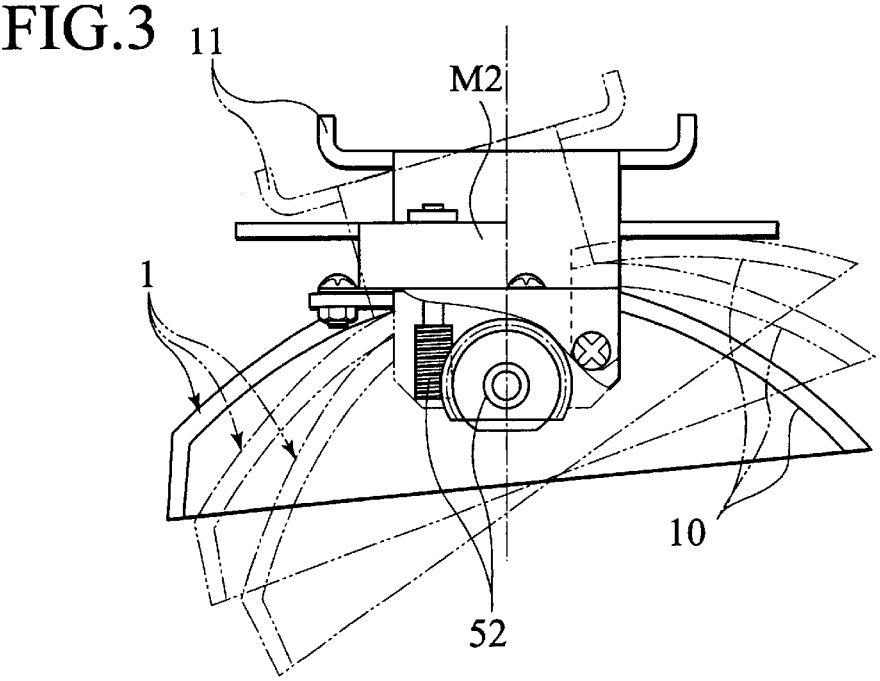
FIG. 3 is a view seen in a direction of arrow III in FIG. 2.

The lower reflector member 3 is rotatable relative to a lamp housing (not shown). That is, as shown in FIGS. 1 to 3, a fixed bracket 31 having a substantially channel shape in side view is fixed to the lamp housing. The lower reflector member 3 and a rotation bracket 11 are mounted on the fixed bracket 31 through a bearing portion 33. A first driving motor M1 serving as driving means is fixed to the fixed bracket 31. A first rotating force transmission mechanism 51 comprising a worm and a worm wheel (a portion of a gear portion has been chamfered in a flat face) is interposed between the first driving motor M1 and the rotation bracket 11. As a result, the lower reflector member 3 is made rotatable relative to the lamp housing. Also, the lower reflector member 3 is rotatable in left and right directions about a first axis V1-V1 which is approximately parallel to a vertical axis VU-VD passing through the vicinity of a focal point F of a reflection face 10 of the upper reflector member 1 described later and/or a reflection face 30 of the lower reflector member 3.

Figure 4B:
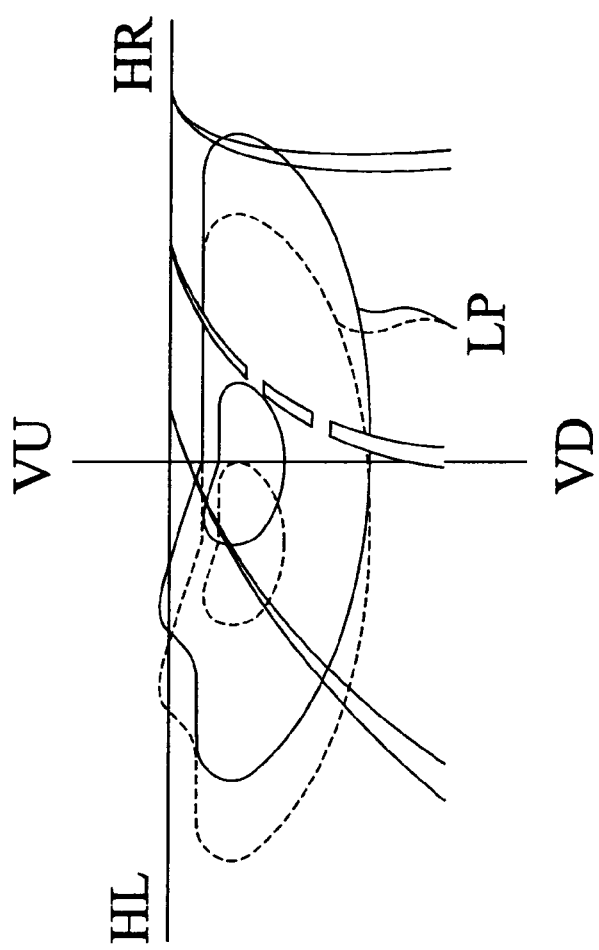
FIG. 4B is an explanatory diagram of a forward view of the luminous intensity distribution pattern in the first embodiment.

A discharge lamp (a high pressure metal vapor discharge lamp such as a metal halide lamp or the like, a high intensity discharge lamp (HID), or the like) 4 serving as a light source bulb is attachably/detachably mounted to a substantially central portion of the lower reflector member 3. Also, a reflection face 30 for forming a luminous intensity distribution pattern LP for a predetermined low beam (for passing each other) is provided on an inner face of the lower reflector member 3. The luminous intensity distribution pattern LP for a predetermined low beam is defined as a reference luminous intensity distribution pattern. Incidentally, the luminous intensity distribution pattern LP for a predetermined low beam is formed in a shape shown with a solid line and a broken line in FIG. 4B, shown with a broken line in FIGS. 5B and 7, or shown with a solid and partially broken line in FIG. 6B.

The upper reflector member 1 is rotatable relative to the rotation bracket 11. That is, a shaft portion 13 is fixed to the upper reflector member 1. Meanwhile, a second driving motor M2 serving as driving means is fixed to the rotation bracket 11. A second rotating force transmission mechanism 52 comprising a worm and a worm wheel (a portion of a gear portion has been chamfered in a flat face) is interposed between the second driving motor M2 and the shaft portion 13. As a result, the upper reflector member 1 is made rotatable relative to the rotation bracket 11. Also, the upper reflector member 1 is rotatable in left and right directions about a second axis V2—V2 which is inclined rearward relative to the vertical axis VU-VD passing through the reflection face 10 of the upper reflector member 1 described later and/or the vicinity of the focal point F of the reflection face 30 of the lower reflector member 3.

A reflection face 10 for forming a diffusing luminous intensity distribution pattern WP is provided on an inner face of the upper reflector member 1. Incidentally, the diffusing luminous intensity distribution pattern WP is formed in a shape shown with a portion of a solid line in FIGS. 5A and 5B, or shown with a solid line projecting outside a broken line in FIGS. 6A, 6B and 7, a shape of a so-called eye slanting downward.

A stepping motor is used as each of the first driving motor M1 and the second driving motor M2. This stepping motor is driven in one direction to cause a member to abut a member to be driven (in this embodiment, the member is the upper reflector member 1, the lower reflector member or the like) against a stopper and then is reversed in the other direction by a predetermined stepping number so that 0 setting is performed. After 0 setting, the stepping motor is rotated or revered by a stepping number ordered on the basis of information (in this embodiment, information about turning angle and running speed of an automobile).

The above-mentioned upper reflector member 1, lower reflector member 3, discharge lamp 4, first driving motor M1, second driving motor M2, fixed bracket 31, rotation bracket 11, first rotating force transmission mechanism 51, second rotating force transmission mechanism 52 and the like are disposed in a lamp chamber (not shown) defined by the lamp housing and a front lens or a front cover (not shown), thereby structuring the headlamp of an automobile. The headlamp of an automobile thus structured is equipped to each of both left and right sides of a front section of an automobile. Incidentally, the lower reflector member 3 (including the upper reflector member 1) may be mounted to the lamp housing via an optical axis adjustment mechanism for a vertical direction, or upward and downward directions (not shown) and an optical axis adjustment mechanism for a horizontal direction or, left and right directions (not shown) so as be adjustable in the vertical direction and the horizontal direction.

The headlamp of an automobile of the present invention in the first embodiment is structured in the above manner and how to use or operation thereof will be explained below, referring to the above related drawings including flow chart diagrams(FIGS. 14 and 15).

Figure 4A:
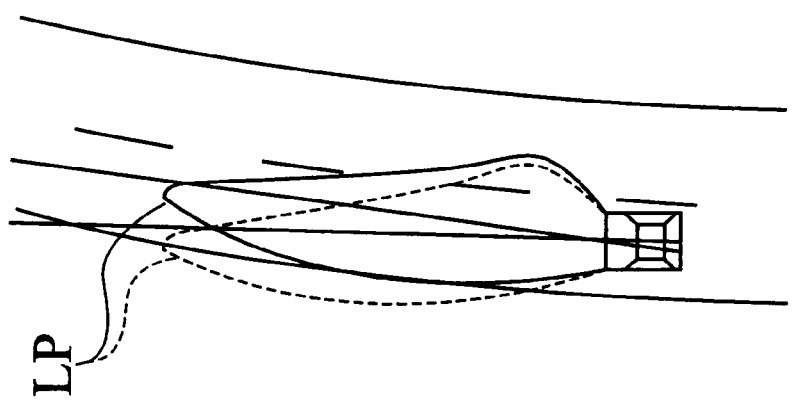
FIG. 4A is an explanatory diagram of a plan view of a luminous intensity distribution pattern obtained when an automobile curves to the right side in a high speed running situation in the first embodiment.
Figure 5B:
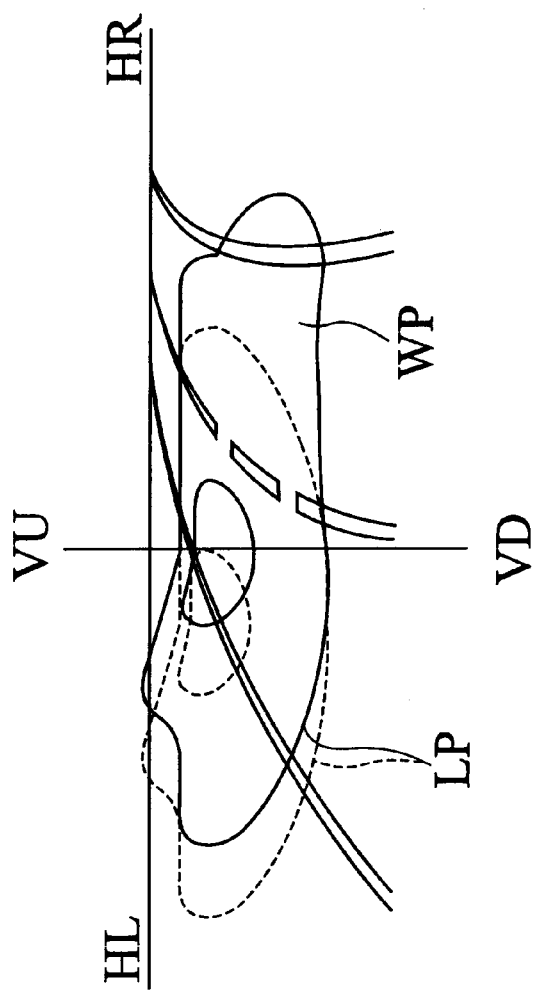
FIG. 5B is an explanatory diagram of a forward view of the luminous intensity distribution pattern in the first embodiment.
Figure 5A:
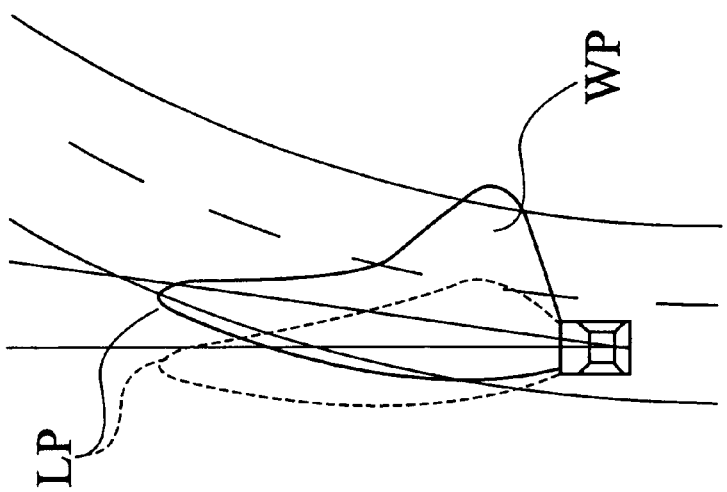
FIG. 5A is an explanatory diagram of a plan view of a luminous intensity distribution pattern obtained when an automobile curves to the right side in a middle speed running situation in the first embodiment.

When the automobile is running straight, the upper reflector member 1 and the lower reflector member 3 are positioned at a neutral position as shown in FIGS. 1 to 3. Here, when the discharge lamp 4 is turned on, light from the discharge lamp 4 is reflected by the reflection face 10 of the upper reflector member 1 and the reflection face 30 of the lower reflector member 3 so that the luminous intensity distribution pattern LP for a predetermined low beam can be obtained which is shown with a solid line and a broken line in FIGS. 4A and 4B, is shown with a broken line in FIGS. 5A, 5B and 7, or is shown with a solid line and a partially broken line in FIGS. 6A and 6B. At this time, the diffusing luminous intensity distribution pattern WP is positioned in the luminous intensity distribution pattern LP for a low beam.

Next, when the automobile curves to the right side in a high speed running situation, the operation of the headlamp is proceeded into a second step S2 through eighteenth step S18 forward to a tenth step S10 as shown in FIG. 14. A steering angle(curving angle) δH and a running speed V of the automobile are measured at the steps S2 and S3. The running speed V is decided whether it is larger than a threshold velocity $V_1$ between high speed and middle speed or not at the step S4. In case the running speed V of the automobile is larger than the threshold velocity $V_1$, an optical axis pan angle θP is calculated at step S18. According to the calculated optical axis pan angle θP, lower reflector pan angle control values θPCR and θPCL are decided as the optical axis pan angle θP at the step S19, respectively. Furthermore, upper reflector pan angle control values θPOR and θПOL are decided as 0 (zero) at the step S20. Hereinafter, the lower and the upper reflector pan angle control values θPCR and θPOR are for the right side headlamp of the vehicle, and the lower and the upper reflector pan angle control values θPCL and θPOL are for the left side headlamp of the vehicle.

According to the above values θPCR and θPCL, the first driving motor (actuator) M1 is driven(step S10) on the basis of the steering angle (curving angle) δH and the running speed V of the automobile so that the lower reflector member 3 and the upper reflector member 1 are respectively rotated about the first axis VI—VI through the rotation bracket 11 and through the rotation bracket 11 and the shaft portion 13 in a right direction by the ordered angle according to the pan angle control values in synchronism with each other. Thereby, as shown in FIGS. 4A and 4B, the luminous intensity distribution pattern LP for a low beam is swung rightward from a position shown with a broken line to a position shown with a solid line.

Meanwhile, when the automobile curves to the left side in the same situation as the above, the first driving motor M1 is driven in the same manner as the above on the basis of the curving angle and the running speed of the automobile so that the lower reflector member 3 and the upper reflector member 1 are rotated about the first axis VI—VI to the left direction by an ordered angle in synchronism with each other and the luminous intensity distribution pattern LP for a low beam is swung in a left direction along the curve of the road.

Incidentally, in this high speed running situation of the curve road, as mentioned above, the lower reflector member 3 and the upper reflector member 1 may be rotated in synchronism with each other, but such a structure may be employed that the upper reflector member 1 is rotated in the reverse direction to the rotation direction of the lower reflector member 3 and only the position of the lower reflector member 3 is changed without changing the position of the upper reflector member 1. In this connection, the steps S19 and S20 shown in FIG. 14 are replaced with alternative steps S21 and S22 shown in FIG. 15. Namely, although the lower reflector pan angle control values θPCR and θPCL are decided as the optical axis pan angle θP at the step S21, the upper reflector pan angle control values θPOR and θPOL are decided as optical axis pan angle −θP, respectively.

On the other hand, when the automobile curves to a right direction in a middle speed running situation, the running speed V is decided whether it is larger than another threshold velocity $V_2$ between middle speed and low speed or not at the step S5. In case the running speed V of the automobile is larger than the threshold velocity $V_2$, an optical axis pan angle θP is calculated at step S12. In case the steering angle δH is larger than 0 (zero) at step S13, upper reflector pan angle control value for the right side headlamp θPOR is decided as θP, and upper reflector pan angle control value for the left side headlamp θPOL is decided as 0 (zero) at the step S14. In addition, lower reflector pan angle control value for the right side headlamp θPCR is decided as θP, and lower reflector pan angle control value for the left side headlamp θPCL is decided as 0 (zero) at the step S15.

According to the above values θPOR, θPOL, θPCR and θPCL, the first and the second driving motors (actuators) M1 and M2 are driven (step S10) on the basis of the steering angle (curving angle) δH and the running speed V of the automobile so that the lower reflector member 3 is rotated in the right direction about the first axis V1—V1 by the ordered angle through the rotation bracket 11 and simultaneously therewith the upper reflector member 1 is rotated in the right direction about the second axis V2—V2 by the ordered angle through the shaft portion 13, the rotation angle of the upper reflector member 1 being larger than that of the lower reflector member 3. Thereby, as shown from a broken line to a solid line in FIGS. 5A and 5B, the luminous intensity distribution pattern LP for a low beam is swung in the right direction along the curve of the road, and the diffusing luminous intensity distribution pattern WP is swung from the right side of the luminous intensity distribution pattern LP for a low beam in the right direction slightly obliquely downward so as to form a shape of eye slanting slightly downward along the curve.

Meanwhile, when the automobile curves in a left direction, in other wards, when the steering angle δH is not larger than 0 (zero) at step S13, upper reflector pan angle control value for the right side headlamp θPOR is decided as 0 (zero), and upper reflector pan angle control value for the left side headlamp θPOL is decided as θP at the step S16. In addition, lower reflector pan angle control value for the right side headlamp θPCR is decided as 0 (zero), and lower reflector pan angle control value for the left side headlamp θPCL is decided as θP at the step S17.

Therefore, the first driving motor M1 and the second driving motor M2 are respectively driven on the basis of the values θPOR, θPOL, θPCR, θPCL about the steering angle δH and the running speed V of the automobile so that the lower reflector member 3 of the left side headlamp is rotated in the left direction about the first axis V1—V1 by an ordered angle and the upper reflector member 1 is rotated in the left direction about the second axis V2—V2 by an ordered angle, the rotation angle of the upper reflector member 1 being larger than that of the lower reflector member 3. Thereby, the luminous intensity distribution pattern LP for a low beam is swung in the left direction along the curve of the road, and the diffusing luminous intensity distribution pattern WP is swung in the left direction slightly obliquely downward along the curve so as to form a shape of an eye slightly slanting downward.

Furthermore, when the automobile curves in a right direction in a low speed running situation, the running speed V is decided not to be larger than the threshold velocity V2 at the step S5, an optical axis pan angle θP is calculated at step S6. In case the steering angle δH is larger than 0 (zero) at step S7, upper reflector pan angle control value for the right side headlamp θPOR is decided as θP, and upper reflector pan angle control value for the left side headlamp θPOL is decided as 0 (zero) at the step S8. In addition, lower reflector pan angle control value for the right side headlamp θPCR is decided as 0 (zero), and lower reflector pan angle control value for the left side headlamp θPCL is also decided as 0 (zero) at the step S9.

Figure 6B:
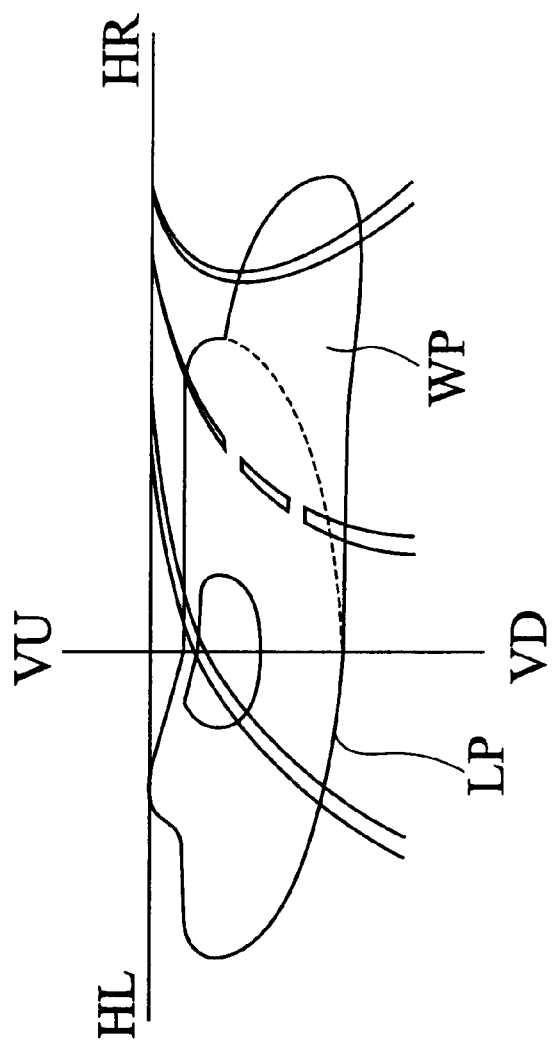
FIG. 6B is an explanatory diagram of a forward view of the luminous intensity distribution pattern in the first embodiment.
Figure 6A:
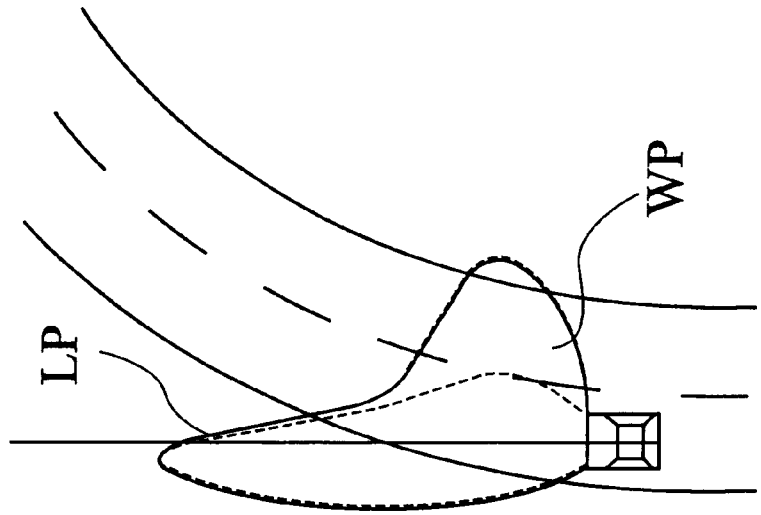
FIG. 6A is an explanatory diagram of a plan view of a luminous intensity distribution pattern obtained when an automobile curves to the right side in a low speed running situation in the first embodiment.

According to the above values θPOR, θPOL, θPCR and θPCL, the second driving motor (actuator) M2 is driven (step S10) on the basis of the steering angle (curving angle) δH and the running speed V of the automobile so that the upper reflector member 1 is rotated to the right direction about the second axis V2—V2 by an ordered angle through the shaft portion 13. Thereby, as shown in FIGS. 6A and 6B, the diffusing luminous intensity distribution pattern WP is swung in the right direction from a position shown with a broken line viewed on the right side of the luminous intensity distribution pattern LP for a low beam to a position shown with a solid line slightly obliquely downward so as to form a shape of an eye slanting downward along the curve to a larger extent than that in the middle speed running situation.

Meanwhile, when the automobile curves in a left direction, in other wards, when the steering angle δH is not larger than 0 (zero) at step S7, upper reflector pan angle control value for the right side headlamp θPOR is decided as 0 (zero), and upper reflector pan angle control value for the left side headlamp θPOL is decided as θP at the step S11. In addition, lower reflector pan angle control value for the right side headlamp θPCR is decided as 0 (zero), and lower reflector pan angle control value for the left side headlamp θPCL is decided as 0 (zero) at the step S9.

According to the above values θPOR, θPOL, θPCR and θPCL, the second driving motor (actuator) M2 is driven(step S10) on the basis of the steering angle (curving angle) δH and the running speed V of the automobile so that the upper reflector member 1 is rotated in the left direction about the second axis V2—V2 by an ordered angle and the diffusing luminous intensity distribution pattern WP is swung in the left direction from the left side of the luminous intensity distribution pattern LP for a low beam slightly obliquely downward so as to form a shape of an eye slanting downward to a larger extent than that in the middle speed running situation.

Figure 7:
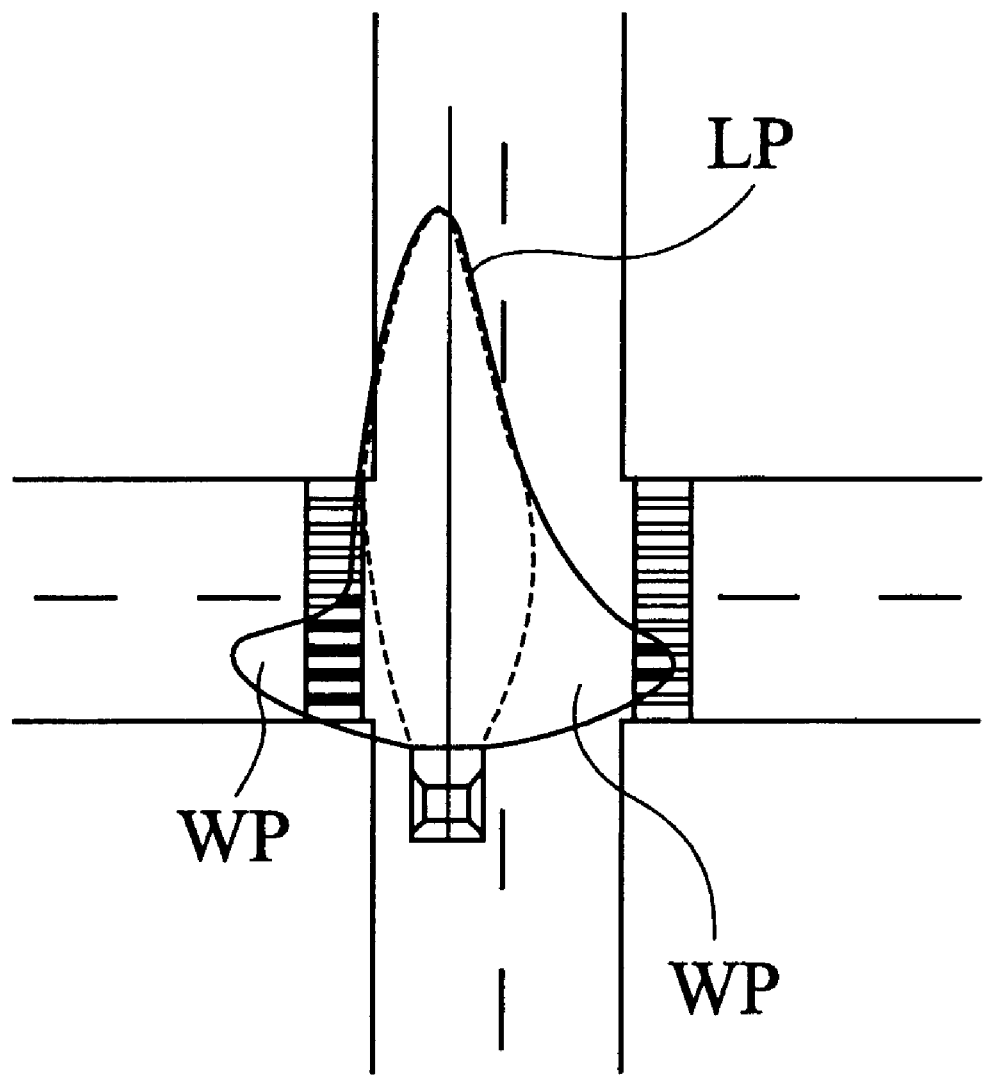
FIG. 7 is an explanatory diagram of a plan view of a luminous intensity distribution pattern when an automobile turns to the left or the right at a crossing point in the first embodiment.
Figure 8:
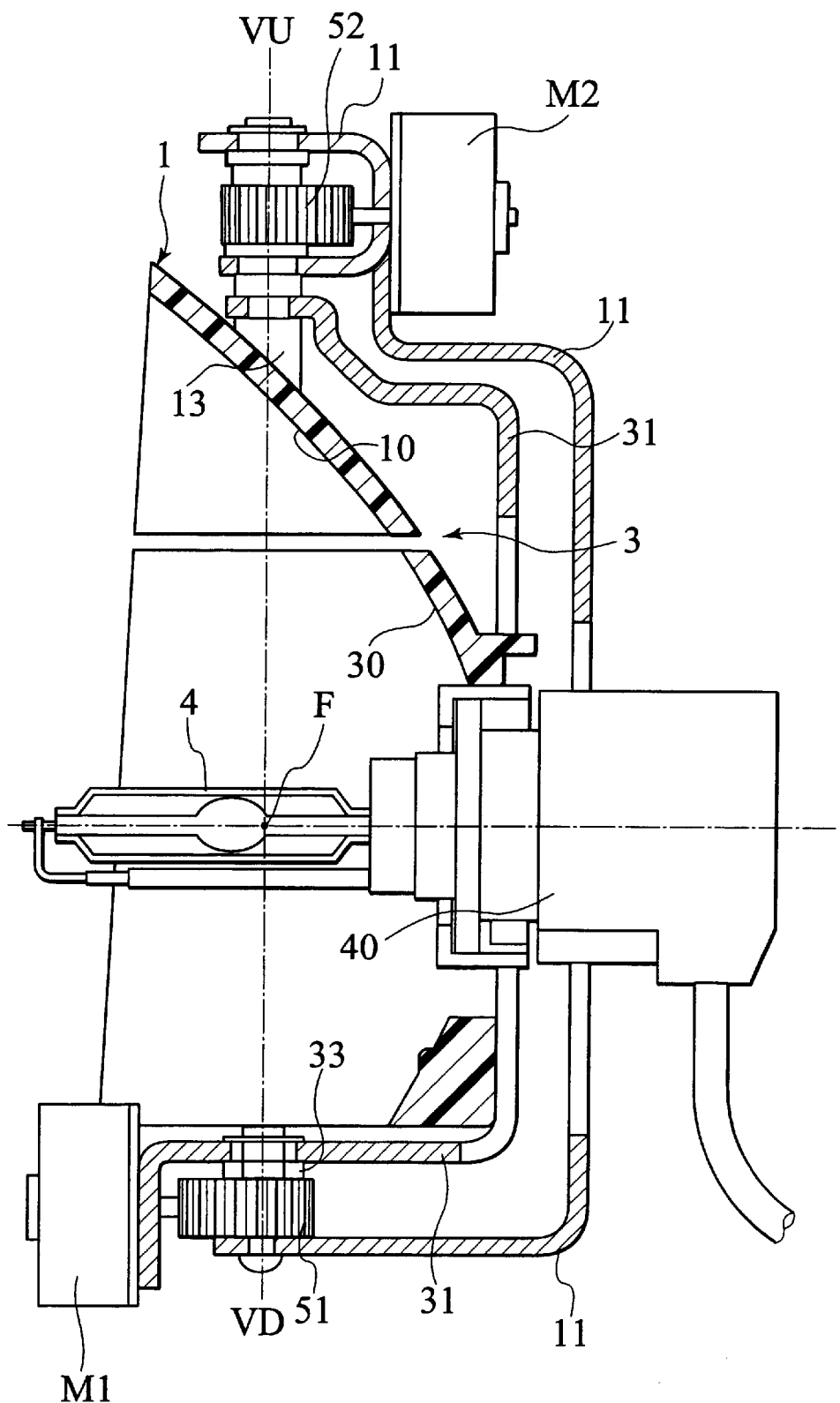
FIG. 8 is a vertical sectional view of a main portion (reflector) showing a second embodiment of a headlamp of an automobile of the present invention.
Figure 9B:
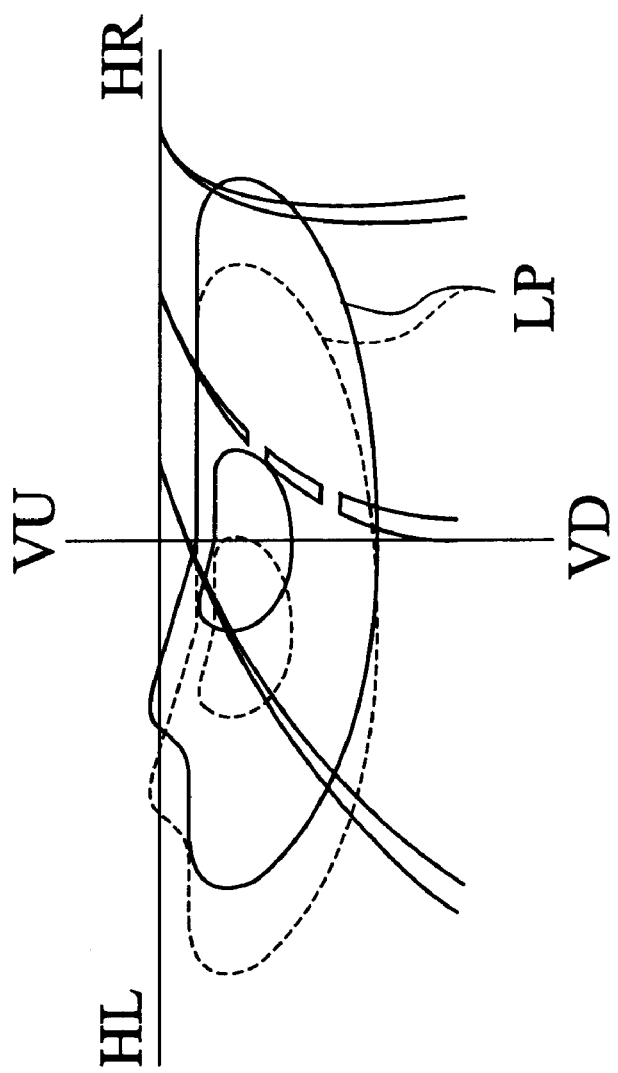
FIG. 9B is an explanatory diagram of a forward view of the luminous intensity distribution pattern in the second embodiment.
Figure 9A:
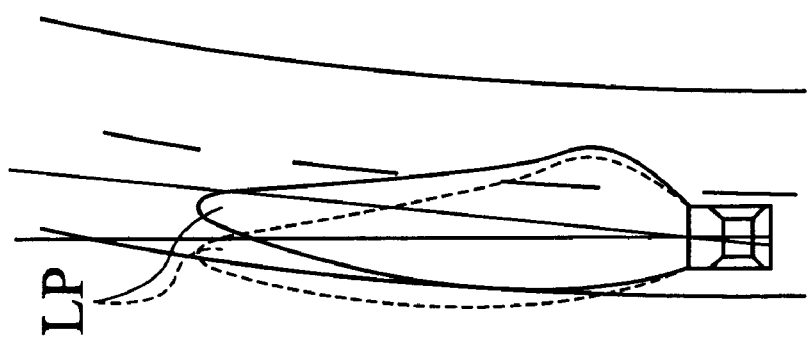
FIG. 9A is an explanatory diagram of a plan view of a luminous intensity distribution pattern obtained when an automobile curves to the right side in a high speed running situation in the second embodiment.

On the other hand, when the automobile turns to the left or the right at a crossing point, for example, when a winker switch is operated, the second driving motor M2 is rotated fully to the maximum angle in a forward direction or a reverse direction according to the signal of the switch so that the upper reflector member 1 is rotated about the second axis V2—V2 through the shaft portion 13 in the left direction or in the right direction up to the maximum angle. Thereby, as shown in FIG. 7, the diffusing luminous intensity distribution pattern WP is swung in the left direction or the right direction from a position shown with a broken line on the left side or the right side of the luminous intensity distribution pattern LP for a low beam to a position shown with a solid line slightly obliquely downward so as to form a shape of an eye slanting downward along the curve.

In this manner, in the headlamp of an automobile in the first embodiment, the upper reflector member 1 and the lower reflector member 3 are rotated simultaneously or independently so that the luminous intensity distribution pattern LP for a low beam which is the reference luminous intensity distribution pattern and the diffusing luminous intensity distribution pattern WP can be changed simultaneously or independently. For example, an ideal luminous intensity distribution pattern can be obtained which can correspond to the view point to be changed according to the running speed of the automobile or according to the peripheral environment situation thereof. As a result, visibility for a walker, an obstacle or the like in the night can be improved on a curved road.

Particularly, in the first embodiment, since the upper reflector member 1 is rotatable about the second axis V2—V2 which is inclined rearward relative to the vertical axis VU-VD, when the upper reflector member 1 is rotated in a middle or low speed running situation or in a running situation of the automobile on a crossing point, the diffusing luminous intensity distribution pattern WP is swung in the left or right direction slightly obliquely downward, namely it is formed in a shape of the so-called eye slanting downward. Therefore, the headlamp of an automobile of the embodiment illuminates an area ahead of the running automobile.

FIGS. 8 to 12 show a second embodiment of a headlamp of an automobile of the present invention. In these figures, the same reference numerals as those in FIGS. 1 to 7 denote the same parts or portions as those in the first embodiment.

In the second embodiment, the lower reflector member 3 and the upper reflector member 1 are rotatable about a coaxial vertical axis VU-VD passing through the vicinity of the focal point F.

Since the headlamp of an automobile of the present invention according to the second invention is structured in the above manner, as shown in FIGS. 9A to 12, the luminous intensity distribution pattern LP for a low beam is swung in the right direction or the left direction along the curve, and simultaneously therewith or independently therefrom a diffusing luminous intensity distribution pattern WP' is swung from the right side or the left side of the luminous intensity distribution pattern LP for a low beam in the right direction or the left direction along the curve. The diffusing luminous intensity distribution pattern WP' forms a transversely long shape which is different from the shape of a downward slanting eye of the diffusing luminous intensity distribution pattern WP of the first embodiment.

The headlamp of an automobile according to the second embodiment can achieve the same operation and effect as those of the above-mentioned first embodiment. Particularly, in the headlamp of an automobile according to the second embodiment, since the rotation axis of the lower reflector member 3 and the rotation axis of the upper reflector 1 are coaxial to the vertical axial VU-VD passing through the vicinity of the focal point F, even when the lower reflector member 3 and the upper reflector member 1 are respectively rotated independently from each other, the position of the focal point F, namely, the center of the discharge lamp 4, is not changed so that luminous intensity distribution control can be easily performed. Also, since the rotation loci of the lower reflector member 3 and the upper reflector member 1 can be minimized, the luminous intensity distribution can be instantaneously performed correspondingly.

FIG. 13 shows a third embodiment of a headlamp of an automobile of the present invention. In the figure, the same reference numerals as those in FIGS. 1 to 12 denote the same parts or members as those in the first and second embodiments. In the headlamp of an automobile according to the third embodiment, the upper reflector member 1 is rotatable about the coaxial vertical axis VU-VD passing through the vicinity of the focal point F, and the lower reflector member 3 is rotatable about the first axis V1—V1 which is approximately parallel to the vertical axis VU-VD.

Since the headlamp of an automobile of the present invention is structured in the above manner, the luminous intensity distribution pattern for a low beam and the diffusing luminous intensity distribution pattern are simultaneously or independently swung in the left or right direction along a curve of a road in generally the same manner as the first and second embodiments shown in FIG. 9A to FIG. 12. The headlamp of an automobile of the third embodiment can achieve the same operation and effect as those in the above-mentioned first and second embodiments.

Particularly, in the third embodiment, since the first axis V1—V1 which is the rotation axis of the lower reflector member 3 and the coaxial vertical axis VU-VD passing through the vicinity of the focal point F which is the rotation axis of the upper reflector member 1 are independent from each other, the first driving motor M1 and the second driving motor M2 can be disposed close to each other so that handling of harnesses can be improved.

Incidentally, in the above-mentioned first, second or third embodiment, since the luminous intensity distribution pattern LP for a low beam and the diffusing luminous intensity distribution pattern WP or WP' are swung in an interlocking manner or in an independent manner from each other on the basis of information about the curving angle or the automobile and information about the running speed of the automobile, swinging control on the luminous intensity distribution pattern LP for a low beam and the diffusing luminous intensity distribution pattern WP or WP' can be performed accurately, so that visibility can further be improved on a curved road correspondingly.

Also, in the above-mentioned first, second and third embodiment, the discharge lamp 4 has been used as the light source bulb, but, for example, a single-filament light bulb or a double-filament light bulb where a light shielding plate is not provided in a glass bulb may be used as the light source bulb. In this case, the reference luminous intensity distribution pattern can be applied to not only the luminous intensity distribution pattern LP for a low beam but also the luminous intensity distribution pattern for a high beam.

Furthermore, in the above-mentioned first, second or third embodiment, the luminous intensity distribution pattern LP for a low beam and the diffusing luminous intensity distribution pattern WP or WP' can be controlled by only the reflection faces 10 and 30, by the reflection faces 10 and 30 and the front lens, or by only the front lens.

In addition, in the above-mentioned embodiments, explanation has been given of the headlamp of an automobile for left side running. Of course, however, the present invention can be applicable to a headlamp of an automobile for right side running. In this case, the structure, the luminous intensity distribution pattern and the like is reversed regarding left and right.

The entire contents of Japanese Patent Application P11-345014 (filed on Dec. 3, 1999) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A headlamp of an automobile, comprising;
 a light source bulb;
 a movable reflector; and
 driving means rotating the movable reflector;
 wherein the movable reflector is rotated by the driving means so that the illumination direction and the illumination range of light from the light source bulb are changed and luminous intensity distribution pattern is changed;
 wherein the movable reflector is divided to two members of an upper reflector member positioned above an optical axis of the light source bulb and a lower reflector member including the optical axis;
 wherein the upper reflector member is rotatable and is provided with a reflection face for forming a diffusing luminous intensity distribution pattern;
 wherein the lower reflector member is provided with the light source bulb, is rotatable and is provided with a reflector face for forming a reference luminous intensity distribution pattern;
 wherein the lower reflector member and the upper reflector member are rotatable in synchronism with each other in a first speed running situation of the automobile;
 wherein the upper reflector member is rotatable at a rotation angle larger than that of the lower reflector member in a second speed running situation of the automobile wherein the automobile speed according to the first speed running situation is greater than the automobile speed according to the second speed running situation;
 wherein the upper reflector member is rotatable in a third speed running situation of the automobile wherein the automobile speed according to the third speed running situation is lower than the automobile speed according to the second speed running situation; and
 wherein the upper reflector member is rotatable when the automobile makes one of a left turn and a right turn at a crossing of a road.

2. A headlamp of an automobile, comprising:
 a light source bulb;
 a movable reflector; and
 driving means rotating the movable reflector;
 wherein the movable reflector is rotated by the driving means so that the illumination direction and the illumination range of light from the light source bulb are changed and luminous intensity distribution pattern is changed;
 wherein the movable reflector is divided to two members of an upper reflector member positioned above an optical axis of the light source bulb and a lower reflector member including the optical axis;
 wherein the upper reflector member is rotatable and is provided with a reflection face for forming a diffusing luminous intensity distribution pattern;
 wherein the lower reflector member is provided with the light source bulb, is rotatable and is provided with a reflector face for forming a reference luminous intensity distribution pattern;
 wherein only the lower reflector member is rotatable in a first speed running situation of the automobile;

wherein the upper reflector member is rotatable at a rotation angle larger than that of the lower reflector member in a second speed running situation of the automobile wherein the automobile speed according to the first speed running situation is greater than the automobile speed according to the second speed running situation;

wherein the upper reflector member is rotatable in a third speed running situation of the automobile wherein the automobile speed according to the third speed running situation is lower than the automobile speed according to the second speed running situation; and wherein the upper reflector member is rotatable when the automobile makes one of a left turn and a right turn at a crossing of a road.

3. A headlamp of an automobile, comprising:

a light source bulb;

a movable reflector; and driving means rotating the movable reflector;

wherein the movable reflector is rotated by the driving means so that the illumination direction and the illumination range of light from the light source bulb are changed and luminous intensity distribution pattern is changed;

wherein the movable reflector is divided to two members of an upper reflector member positioned above an optical axis of the light source bulb and a lower reflector member including the optical axis;

wherein the upper reflector member is rotatable and is provided with a reflection face for forming a diffusing luminous intensity distribution pattern;

wherein the lower reflector member is provided with the light source bulb, is rotatable and is provided with a reflector face for forming a reference luminous intensity distribution pattern;

wherein the upper reflector member is rotatable about an axis which is inclined rearward relative to a vertical axis; and wherein the lower reflector member is rotatable about an axis which is approximately parallel to a vertical axis passing through the vicinity of a focal point of at least one of a reflection face of the lower reflector member and a reflection face of the upper reflector member.

4. A headlamp of an automobile, comprising:

a light source bulb;

a movable reflector; and driving means rotating the movable reflector;

wherein the movable reflector is rotated by the driving means so that the illumination direction and the illumination range of light from the light source bulb are changed and luminous intensity distribution pattern is changed;

wherein the movable reflector is divided to two members of an upper reflector member positioned above an optical axis of the light source bulb and a lower reflector member including the optical axis;

wherein the upper reflector member is rotatable and is provided with a reflection face for forming a diffusing luminous intensity distribution pattern;

wherein the lower reflector member is provided with the light source bulb, is rotatable and is provided with a reflector face for forming a reference luminous intensity distribution pattern; and wherein the upper reflector member and the lower reflector member are rotatable about a coaxial vertical axis passing through the vicinity of a focal point of at least one of a reflection face of the upper reflector member and a reflection face of the lower reflector member.

5. A headlamp of an automobile, comprising:

a light source bulb;

a movable reflector; and driving means rotating the movable reflector;

wherein the movable reflector is rotated by the driving means so that the illumination direction and the illumination range of light from the light source bulb are changed and luminous intensity distribution pattern is changed;

wherein the movable reflector is divided to two members of an upper reflector member positioned above an optical axis of the light source bulb and a lower reflector member including the optical axis;

wherein the upper reflector member is rotatable and is provided with a reflection face for forming a diffusing luminous intensity distribution pattern;

wherein the lower reflector member is provided with the light source bulb, is rotatable and is provided with a reflector face for forming a reference luminous intensity distribution pattern;

wherein the upper reflector member is rotatable about a vertical axis passing through the vicinity of a focal point of at least one of a reflection face of the upper reflection and a reflection face of the lower reflector member; and wherein the lower reflector member is rotatable about an axis which is approximately parallel to a rotation axis of the upper reflector member.

6. A headlamp of an automobile, comprising:

a light source bulb;

a movable reflector; and driving means rotating the movable reflector;

wherein the movable reflector is rotated by the driving means so that the illumination direction and the illumination range of light from the light source bulb are changed and luminous intensity distribution pattern is changed;

wherein the movable reflector is divided to two members of an upper reflector member positioned above an optical axis of the light source bulb and a lower reflector member including the optical axis;

wherein the upper reflector member is rotatable and is provided with a reflection face for forming a diffusing luminous intensity distribution pattern;

wherein the lower reflector member is provided with the light source bulb, is rotatable and is provided with a reflector face for forming a reference luminous intensity distribution pattern;

wherein the upper reflector member is rotatably mounted to a rotation bracket;

wherein the lower reflector member is rotatably mounted to a fixed bracket; and wherein the rotation bracket is rotatably mounted to the fixed bracket.

* * * * *